(12) United States Patent
Swaney et al.

(10) Patent No.: US 6,671,793 B1
(45) Date of Patent: Dec. 30, 2003

(54) METHOD AND SYSTEM FOR MANAGING THE RESULT FROM A TRANSLATOR CO-PROCESSOR IN A PIPELINED PROCESSOR

(75) Inventors: Scott B. Swaney, Catskill, NY (US); Mark S. Farrell, Pleasant Valley, NY (US); John D. MacDougall, Hyde Park, NY (US); Hans-Juergen Muenster, Boeblingen (DE); Charles F. Webb, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 09/678,061

(22) Filed: Oct. 2, 2000

(51) Int. Cl.$^7$ ............................ G06F 15/16; G06F 9/455
(52) U.S. Cl. ........................... 712/34; 712/227; 703/26
(58) Field of Search ............................. 712/34, 36, 227; 703/26

(56) References Cited

U.S. PATENT DOCUMENTS

| | | | |
|---|---|---|---|
| 4,539,637 A | | 9/1985 | DeBruler |
| 4,715,013 A | * | 12/1987 | MacGregor et al. ........ 712/203 |
| 5,590,294 A | * | 12/1996 | Mirapuri et al. ............ 712/244 |
| 5,673,391 A | | 9/1997 | Webb et al. |
| 5,692,121 A | | 11/1997 | Bozso et al. |
| 5,713,035 A | | 1/1998 | Farrell et al. |
| 5,790,844 A | | 8/1998 | Webb et al. |
| 6,021,484 A | * | 2/2000 | Park ............................. 712/41 |
| 6,038,651 A | | 3/2000 | VanHuben et al. |
| 6,058,470 A | | 5/2000 | Webb et al. |
| 6,075,937 A | * | 6/2000 | Scalzi et al. .................. 703/23 |
| 6,085,307 A | * | 7/2000 | Evoy et al. ..................... 712/31 |
| 6,175,915 B1 | * | 1/2001 | Cashman et al. ........... 712/227 |
| 6,247,113 B1 | * | 6/2001 | Jaggar ........................ 712/200 |
| 6,321,323 B1 | * | 11/2001 | Nugroho et al. .............. 712/34 |
| 6,480,952 B2 | * | 11/2002 | Gorishek et al. ........... 712/227 |

\* cited by examiner

Primary Examiner—William M. Treat
(74) Attorney, Agent, or Firm—Lynn Augspurger; Cantor Colburn LLP

(57) ABSTRACT

An exemplary embodiment of the invention is a method and system for managing a result returned from a translator co-processor to a recovery unit of a central processor. The computer system has a pipelined computer processor and a pipelined central processor, which executes an instruction set in a hardware controlled execution unit and executes an instruction set in a milli-mode architected state with a millicode sequence of instructions in the hardware controlled execution unit. The central processor initiates a request to the translator co-processor a cycle after decode of a perform translator operation instruction in the millicode sequence. The translator co-processor processes the perform translator operation instruction to generate a perform translator operation result. The translator co-processor returns the results to a recovery unit of the central processor. The recovery unit stores the perform translator operation result in a system register. The request for the perform translator operation result by the central processor is interlocked by a hardware interlock of the recovery unit until the translator co-processor returns the perform translator operation result. The mechanism allows the recovery unit to maintain the correct perform translator operation result with speculative execution and instruction level retry recovery throughout the duration of the perform translator operation.

11 Claims, 1 Drawing Sheet

METHOD AND SYSTEM FOR MANAGING THE RESULT FROM A TRANSLATOR CO-PROCESSOR IN A PIPELINED PROCESSOR

BACKGROUND OF THE INVENTION

1. Field of the Invention

This invention relates to a mechanism to manage the result returned from a translator co-processor to a central processor in a pipelined architecture. Particularly, the invention relates to a system and method including a recovery unit (R-Unit or result unit) utilized for managing communications between co-processors and pipelined central processors.

2. Description of the Related Art

High performance processors are typically pipelined. Pipelining is a method of processing that allows for fast concurrent processing of data. This is accomplished by overlapping operations in a portion of memory that passes information from one process to another process. Most processor instructions have to go through the same basic sequence: the instruction must be fetched, it must be decoded, it must have its operands fetched, (which may first require address generation), it must be executed, and its results must be put away. The pipelining method fetches and decodes instructions in which, at any given time, several program instructions are in various stages of being fetched or decoded. The pipelining method improves the speed of system execution time by ensuring that the microprocessor does not have to wait for instructions. When the processor completes execution of one instruction, the next instruction is ready to be performed.

However, pipelining is not without inefficiency. The flow of instructions through the pipeline may stall. For example, when an instruction N modifies a register which a subsequent instruction N+2 needs for calculating the address of N+2's operands, the instruction N+2 is delayed until the instruction N is finished modifying the register. In other words, the instruction N+2 may progress to the address generation stage, but must be delayed at that point until the instruction N modifies the register that the N+2instruction needs. Only after N is finished can N+2 continue in the pipeline. Another common situation which may stall the flow of the instructions through the pipeline is during the operand fetch stage of the pipeline where it may not yet know whether that particular operand access is allowed, or whether it should be denied (and report an exception) based on architectural restrictions. The corresponding instruction stalls until the operand access permission is determined. This stall period while checking for exceptions is referred to as "exception_pending." Further, there are situations where instructions at various stages of the processor pipeline may need to be terminated and discarded due to an error in a branch instruction stream.

A common situation where this occurs is for incorrectly predicted branches. For example when an instruction stream is being executed, and a branch instruction Nb is encountered, the next instruction N+1 may come from more than one place. If the branch for Nb is not taken, then instruction N+1 is the next sequential instruction in the instruction stream. If the branch for Nb is taken, then instruction N+1 is the instruction at the branch location instructed by Nb (this is referred to as a "branch target"). However, when branch instruction Nb is at the decode stage of the pipeline, there is no definitive way to determine whether the branch is supposed to be taken or not taken. So, the instruction fetching logic "predicts" whether instruction N+1 should be the next sequential instruction, or whether the branch target should be next. The "predicted" instruction N+1 then enters the pipeline following the branch instruction Nb. Until the moment when the branch instruction Nb is evaluated, which happens at the execution stage of the pipeline, the processor can not determine with certainty whether the "predicted" instruction N+1 was the correct instruction. When the branch instruction Nb reaches the execution stage of the pipeline, it is evaluated as to whether the branch instruction should have been taken or should not have been taken. If the instruction N+1 was not predicted correctly, then a "branch wrong" exists. A branch wrong requires that instructions N+1 and later be terminated and removed from the pipeline. Next, the instruction fetching logic backs up to where the decision was made and fetches a different instruction N+1 down the other path. Therefore, the instructions that enter the pipeline following a branch instruction are "conditional" until the branch is resolved as taken or is resolved as not taken. This may also be referred to as a "conditional path" or a "speculative execution."

The resultant stalling of the flow of instructions, the need to terminate and discard instructions and the occurrence of incorrectly predicted branches produces system inefficiency. A system which uses a translator co-processor with a central processor in a pipelined configuration will encounter such inefficiencies. Accordingly, there remains a need for improving pipeline processing of certain types of instructions.

SUMMARY OF THE INVENTION

An exemplary embodiment of the invention is a method and system for managing a result returned from a translator co-processor to a recovery unit of a central processor. The computer system has a pipelined computer processor and a pipelined central processor, which executes an instruction set in a hardware controlled execution unit and executes an instruction set in a milli-mode architected state with a millicode sequence of instructions in the hardware controlled execution unit. The central processor initiates a request to the translator co-processor a cycle after decode of a perform translator operation instruction in the millicode sequence. The translator co-processor processes the perform translator operation instruction to generate a perform translator operation result. The translator co-processor returns the results to a recovery unit of the central processor. The recovery unit stores the perform translator operation result in a system register. The request for the perform translator operation result by the central processor is interlocked by a hardware interlock of the recovery unit until the translator co-processor returns the perform translator operation result. The mechanism allows: the recovery unit to maintain the correct perform translator operation result with speculative execution and instruction level retry recovery throughout the duration of the perform translator operation.

DESCRIPTION OF THE DRAWINGS

Referring now to the exemplary drawings wherein like elements are numbered alike in the FIG..

DETAILED DESCRIPTION

Figure 1:
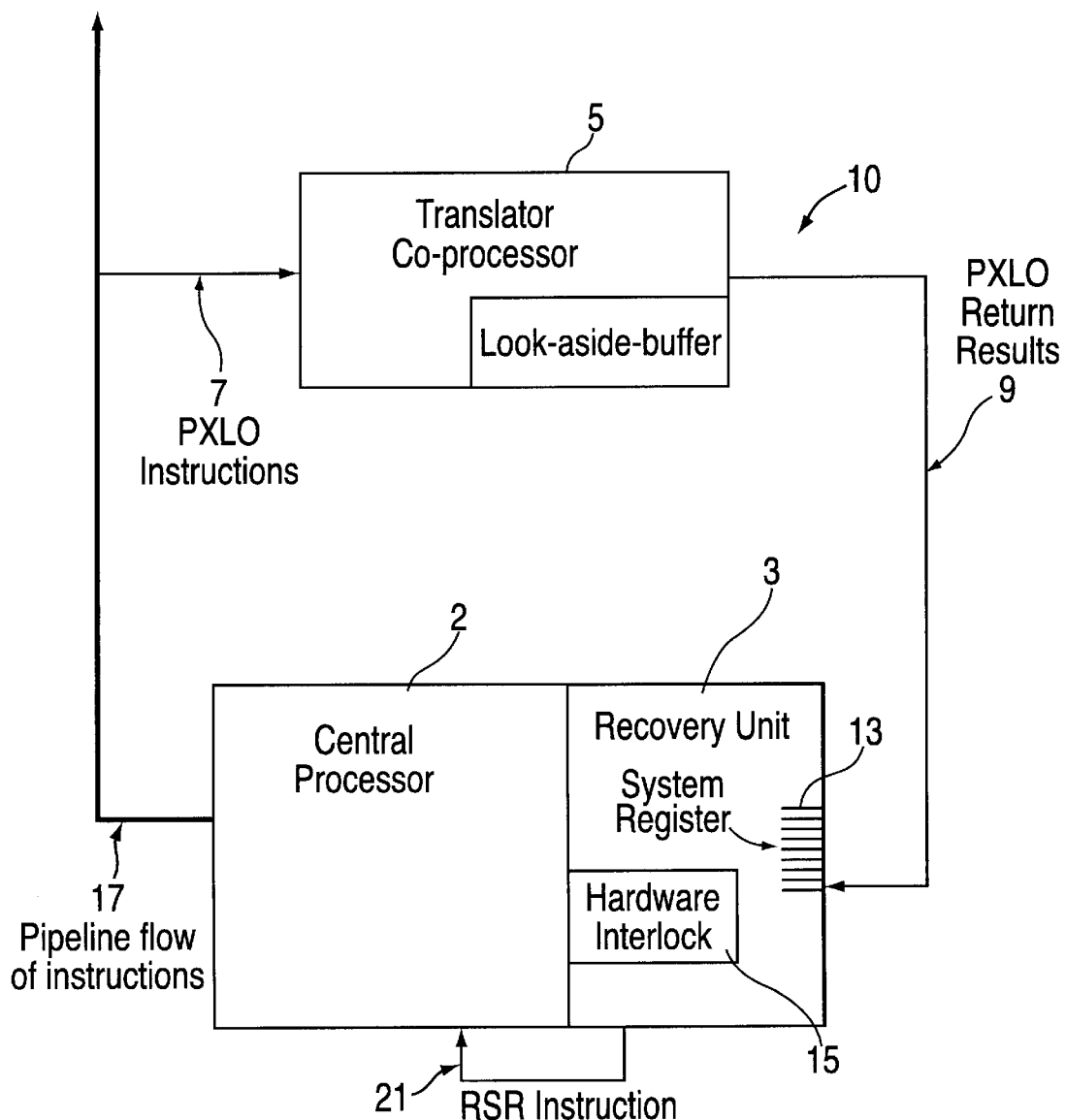
FIG. 1 is an exemplary data processing system embodiment.

Many system architectures possess registers, including multiple copies of registers throughout the processor, for enhancing performance and cycle time. When an instruction is executed which updates a register, the new value is placed on a common bus (i.e. C-bus) during the put away stage of a pipeline. All copies of the registers are updated from the common bus. In order to recover from errors, a recovery unit is deployed where one copy of every register is contained in the recovery unit. A detailed description of a recovery unit for mirrored processors is found in U.S. Pat. No. 5,692,121 to Bozso et.al, issued Nov. 25, 1997, and incorporated by reference.

The recovery unit is used to maintain "checkpointed" results, which can be used to restore the state of the processor after detection of an error. "Checkpointed" means that at any given time, there is one copy of the registers that reflect the results at the completion of an instruction. When an error is encountered, all copies of the registers are restored to their checkpointed state, control is returned back to the point following the last instruction.

Operations in systems may be performed multiple times. Some instructions in certain architecture are too complicated to be executed by simply flowing through the logic in the central processor. Some of these complicated instructions are broken down into "sub-programs" which use multiple, existing simpler instructions to perform the complicated function that the instruction is designed to perform. These "sub-programs" are known as millicode. Millicode is similar to vertical micro code. Further still, some of these instructions in the system require complicated operations which cannot be handled within the simple pipeline, even after being broken down into millicode routines. Rather than make the pipeline more complicated to handle these complicated operations, a co-processor is used to perform the operations. When an instruction is encountered which requires these special operations, it deviates from the normal pipeline flow, and is sent over to the co-processor. The co-processor performs the required operations. The co-processor returns the results back to the central processor. Ideally, when an instruction is sent over to the co-processor, the central processor may continue to execute other instructions while the co-processor performs its required operations. When the results are available form the co-processor, the central processor uses them.

In the present system, a translator co-processor is used. The translator co-processor processes Perform Translator Operation (PXLO) instructions, and returns the results to the recovery unit. The recovery unit holds the result in a system register The translator co-processor performs various functions for the PXLO instruction. This instruction is only used by millicode. For an operation which requires the translator co-processor, the millicode instruction stream will typically execute a PXLO instruction, then execute instructions which do not depend on the PXLO instruction result from the co-processor. Subsequently, the central processor will perform the instructions that do depend on the PXLO instruction results. In other words, the central processor issues the PXLO to the co-processor, performs other useful work while the co-processor is working on the PXLO instruction, and then picks up the PXLO instruction result when it is available.

Since the millicode routines are written to optimize performance, the millicode routines attempt to do as much work as possible between issuing the PXLO and using the result. There is no certainty for the millicode to predict how quickly, or after how many cycles, the co-processor will return the result. Additionally, due to speculative execution, a PXLO instruction may get decoded and sent to the co-processor, but then get cleared by a branch-wrong. The co-processor may or may not return a result to the result unit before the branch-wrong is encountered. Also, the PXLO instruction that was speculatively decoded may have been before or after the PXLO instruction that was decoded on a correct path.

Referring now to FIG. 1, there is shown an exemplary data processing system employing the method and system of the present invention. As shown, the data processing system 10 includes a central processor 2 and a translator co-processor 5 and a recovery unit 3 electronically coupled.

The system 10 uses the translator co-processor 5 to process requests in a milli-mode architected state with a millicode sequence of instructions 7 to be returned to the central processor 2. The system's 10 requests to the translator co-processor 5 are issued the cycle after a decode of a perform translator operation (PXLO) instruction 7 in a millicode stream. When the translator co-processor 5 finishes the operation, it returns data through a communication link to the recovery unit 3 of the central processor 2. The recovery unit 3 stores the PXLO instruction result 9 in a system register 13 which is assigned addresses (for example SYSRCO). The central processor 2 obtains the result 9 of the PXLO instruction by reading address SYSRCO in register 13 from the recovery unit 3. This is done via a read special register (RSR) instruction 21. The recovery unit 3 has a hardware interlock 15 integral to its circuitry that will not return the data for the RSR instruction 21 until the recovery unit 3 has received the PXLO result 9 from the translator co-processor 5.

As in many pipelined systems, in this system the central processor 2 may do other processing between the PXLO instruction 7 and RSR 21 instructions to take advantage of the time that the translator co-processor 5 may need to perform the operation. It is when this processing takes place that the possibility of system inefficiency can occur. During this processing, another PXLO instruction could be speculatively decoded down an incorrect conditional path. Since the request to the translator co-processor 5 is issued by decode, not execution, the translator co-processor 5 could possibly process a false operation and return a new but incorrect value to the recovery unit 3. The current invention prevents this incorrect value from overwriting the value returned for the first correct PXLO instruction. The current invention also supports hardware instruction level reset/refresh/retry recovery implementation in the processor.

In a preferred embodiment, the system may have a millicode control register with a recovery unit address '41'x (MCR41). In this system configuration, the MCR41 must be written by millicode prior to each PXLO instruction. Note that MCR41 is written for millicode entry, which will suffice for the first PXLO instruction in the millicode stream. However, if there are multiple conditional paths containing PXLO instructions, or if there are multiple PXLO instructions to be done, even with the same command code, millicode must do a fresh write to MCR41 in the same conditional path as each PXLO instruction. MCR41 must not be written between a PXLO instruction and the read of its result data from SYSRCO because any write to MCR41 makes the result from the prior PXLO instruction unstable. Millicode will never do an explicit write to SYSRCO.

A reset signal which includes exceptional condition or serialization interrupts, incorrect branch resolution, and recovery reset will be provided to both the translator co-processor 5 and the recovery unit 3. Once it has received this reset signal, the translator co-processor 5 (and Data-cache) will effectively cancel any PXLO operation in progress. It is not required that work cease immediately, but it is required that no data shot be sent to the recovery unit 3 for that operation once it has been canceled. The translator co-processor 5 will always send exactly one data shot to the recovery unit 3 for each (non-canceled) PXLO operation.

The hardware interlock 15 will block decode of a PXLO instruction if a write to MCR41 is pending (using a pseudo-address generation interlock mechanism). The hardware interlock 15 will indicate PXLO decode to the recovery unit 3, so the recovery unit 3 knows to block all RSR instructions to SYSRCO until the PXLO instruction has completed.

When the PXLO instruction reaches the execution stage of the pipeline, if the translator co-processor 5 (which started processing the PXLO instruction back at the decode stage of the pipeline) has not finished processing yet, then the PXLO instruction is stalled at the execution stage. This pipeline stall is implemented by making it look like exception checking is still going on until the translator co-processor 5 has has completed processing the PXLO instruction and sent the result data to the recovery unit 3. Thus, exception_ending will hold up the PXLO instruction at the execution stage of the pipeline. When the translator co-processor 5 sends the PXLO result to the recovery unit 3, exception_pending goes away, and the PXLO proceeds through the execution stage of the pipeline. SYSRCO is written via the C-bus on the put-away stage of the pipeline. The data for this C-bus write is undefined. This C-bus write is only used to clear the hardware interlock 15 for a subsequent RSR instruction to SYSRCO.

The recovery unit 3 will ignore the data for a C-bus write to SYSRCO when it is not due for a refresh during the recovery sequence. This C-bus write is only used to clear the interlock for a subsequent RSR instruction to SYSRCO. When in the refresh phase of the recovery sequences, the recovery unit 3 will capture data from a C-bus write to SYSRCO to refresh its contents.

The preferred embodiment for capturing of the PXLO instruction result in the recovery unit 3 is described. There is a 64-bit buffer register in addition to the 64-bit SYSRCO result register. In a preferred embodiment, the buffer register is the same width as the result register. However, the actual width and address assigned to the result register are not critical to the invention. The buffer register will have 3 possible states: ready, data pending, and done. The buffer is initialized to the done state at initial machine load (IML) time. A C-bus write to MCR41 when not in refresh mode moves the buffer to the ready state regardless of its current state.

While in the ready state, a data shot from the translator co-processor is ingated to the buffer/staging register and the buffer moves to the data pending state; a data shot while in any other state is ignored. While in the data pending state, a C-bus write when not in refresh mode to SYSRCO will ignore the C-bus data, transfer the buffer/staging register to SYSRCO, and move the buffer to the done state; a C-Bus when not in refresh mode write to SYSRCO while in any other state is ignored. While in the data pending state, the reset signal will move the buffer back to the ready state. The reset signal in any other state does not change state.

A wrong-path PXLO instruction may be handled in multiple ways. The wrong path PXLO instruction may be canceled before the data shot, in which case the buffer/result register controls never see it. The wrong path PXLO instruction may occur before the MCR41 write for a real PXLO instruction, in which case the MCR41 write (which must be after the branch wrong reset, and therefore after the data shot, else this would be in the first category) will move the buffer back to the ready state. The old (bad) data shot will either not be captured at all, or if there was a previous write to MCR41 would be captured, but overlaid by the good data. The wrong path PXLO instruction may be between the MCR41 write and the real PXLO instruction, in which case the branch wrong reset (which is presumed to be after the data shot, else this would be in the first category) will move the buffer back to the ready state and the old (bad) data shot will be overlaid by the real one. The wrong path PXLO instruction may be after a real PXLO instruction, in which case the buffer will be in either the data pending or done state, and the wrong data shot will be ignored. The wrong path PXLO instruction may be nowhere near a real PXLO instruction, in which case it does not matter if the data is captured or not. For the purposes of these controls, a real PXLO instruction which gets canceled and re-executed for any reason is equivalent to a wrong-path PXLO instruction.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A machine for data processing comprising:
   a central processor for generating a pipelined flow of instructions;
   a translator co-processor coupled to said central processor for receiving a portion of said pipelined flow of instructions;
   a recovery unit coupled to said central processor and coupled to said translator co-processor, wherein said recovery unit has an integral system register and a hardware interlock.

2. The machine for data processing of claim 1, further comprising:
   a communication link from said recovery unit to said central processor using a read special register instruction and said hardware interlock.

3. The machine for data processing of claim 1, further comprising:
   a communication link from said translator co-processor to said recovery unit returning perform translator operation instruction results.

4. The machine for data processing of claim 1, further comprising:
   a communication link from said central processor to said translator co-processor using perform translator operation instructions.

5. In a pipelined computer processor with a translator co-processor and a central processor, which executes an instruction set in a hardware controlled execution unit and executes an instruction set in a milli-mode architected state with a millicode sequence of instructions in said hardware controlled execution unit, a method for managing a result returned from said translator co-processor to a recovery unit of said central processor, said method comprising:
   initiating a request a cycle after decode of a perform translator operation instruction in said millicode sequence from said central processor to said translator co-processor;
   processing said perform translator operation instruction to generate a perform translator operation result in said translator co-processor;
   returning said perform translator operation result to said recovery unit;

storing said perform translator operation result in a system register of said recovery unit;

interlocking in said recovery unit the read of said perform translator operation result by said central processor until said perform translator operation result is returned from said translator co-processor to said recovery unit; and obtaining said perform translator operation result from said recovery unit by said central processor.

6. The method of claim 5 wherein the recovery unit has a hardware interlock for interlocking said perform translator operation result for said recovery unit.

7. The method of claim 5 further comprising:

said central processor obtaining the perform translator operation result from the recovery unit through a read special register instruction after the hardware interlock releases the perform translator operation result.

8. The method of claim 5, further comprising:

backing up checkpointed data with said recovery unit; and recovering from a system error.

9. The method of claim 5, further comprising:

continuing system processing from the checkpointed data; and maintaining correct results.

10. The method of claim 5 further comprising:

maintaining the correct perform translator operation result in said recovery unit, wherein said method allows for discarding instructions and backing up for incorrectly predicted branches and exceptional conditions in said pipelined computer processor.

11. A storage medium encoded with machine-readable computer program code for managing a result from a translator co-processor to a recovery unit of a central processor that executes instructions in a pipelined millicode stream to the translator co-processor, the storage medium including instructions for causing a computer to implement a method comprising:

initiating a request to said translator co-processor a cycle after decode of a perform translator operation instruction in said millicode stream;

processing said perform translator operation instruction to generate a perform translator operation result;

interlocking said recovery unit until said perform translator operation result is generated; and storing said perform translator operation result in a system register of said recovery unit.

* * * * *